(12) United States Patent
Barwicz

(10) Patent No.: US 12,411,283 B1
(45) Date of Patent: Sep. 9, 2025

(54) STRUCTURE FOR REFLECTIVE LOOPBACK OF LOW-CONFINEMENT WAVEGUIDES

(71) Applicant: Cisco Technology, Inc., San Jose, CA (US)

(72) Inventor: Tymon Barwicz, Holmdel, NJ (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 18/099,323

(22) Filed: Jan. 20, 2023

(51) Int. Cl.
*G02B 6/125* (2006.01)
*G02B 6/12* (2006.01)

(52) U.S. Cl.
CPC .... *G02B 6/125* (2013.01); *G02B 2006/12097* (2013.01); *G02B 2006/12104* (2013.01)

(58) Field of Classification Search
CPC .......... G02B 6/125; G02B 2006/12097; G02B 2006/12104; G02B 6/12016; G02B 2006/12147; G02B 6/12004; G02B 6/13
See application file for complete search history.

(56) References Cited

U.S. PATENT DOCUMENTS 6,243,516 B1 * 6/2001 Seino ............... G02B 6/125
385/47

* cited by examiner

*Primary Examiner* — John Bedtelyon
(74) *Attorney, Agent, or Firm* — Patterson + Sheridan, LLP

(57) ABSTRACT

In part, the disclosure relates to a reflective loopback structure comprising a reflector, a first waveguide defining an optical input, a second waveguide defining an optical output; and a merged waveguide structure defining a front surface and a back surface and a first axis. In some embodiments, the reflector disposed at a back surface, the first axis normal to the front surface and the back surface, and the first waveguide and the second waveguide angled relative to each other by an angle θ defined therebetween. In many embodiments, the waveguides extend from the front surface in different directions and each angled relative to the first axis by an angle φ, wherein φ is about θ/2, the optical input in optical communication with the optical output, the reflector in optical communication with the first optical input and the first optical output.

16 Claims, 9 Drawing Sheets

STRUCTURE FOR REFLECTIVE LOOPBACK OF LOW-CONFINEMENT WAVEGUIDES

FIELD

This disclosure relates generally to the fields of photonic integrated circuits.

BACKGROUND

Contemporary optical communications and other photonic systems make extensive use of photonic integrated circuits that are advantageously mass-produced in various configurations for various purposes.

SUMMARY

In part, in one aspect, the disclosure relates to a photonic integrated circuit with a structure operable to reverse the direction of light via a reflector. In one aspect, the disclosure relates to a structure that reverses the direction of light carried by low-confinement waveguides. In one aspect, a loopback device may be particularly difficult to implement when low-confinement waveguides are used. Low-confinement waveguides must change direction very slowly to avoid losses and so a loopback structure may consume a prohibitively large area in a photonic integrated circuit. Even where a reflector is used to reverse the direction of light in a small area, a design of a reflector that avoids excess losses due to diffraction and other effects and a design of a structure that guides light to that reflector are not obvious. Disclosed herein is a design of a structure comprising low-confinement waveguides with adiabatic transitions in curvature and width so as to gradually guide light to a reflector, possibly curved, that achieves a reversal of the direction of light in a photonic integrated circuit or other device. In part, in one aspect, the disclosure relates to an optical device that includes a reflective loopback structure. The reflective loopback structure may include a reflector; a first ridge waveguide defining an optical input, the first ridge waveguide comprising one or more first sections defined along a length of the first ridge waveguide; a second ridge waveguide defining an optical output, the second ridge waveguide comprising one or more second sections defined along a length of the second ridge waveguide; and a merged waveguide structure defining a front surface and a back surface and a first axis. In many embodiments, the reflector is disposed along at least a portion of the back surface, the first axis normal to the front surface and the back surface. In some embodiments, the first ridge waveguide and the second ridge waveguide are angled relative to each other by an angle θ defined therebetween. In many embodiments, the first ridge waveguide and the second ridge waveguide each extend from the front surface in different directions and each is angled relative to the first axis by an angle φ, wherein φ is about θ/2. In various embodiments, the optical input is in optical communication with the optical output and the reflector is in optical communication with the first optical input and the first optical output.

In various embodiments, the angle θ is between about 10 to about 40 degrees. In many embodiments, the angle θ is between about 15 to about 30 degrees. In various embodiments, the one or more first sections defined along a length of the first ridge waveguide comprises a first section of constant width extending from the optical input and a second section of tapering width, the second section of tapering width in optical communication with the first section and the merged waveguide structure. In various embodiments, the one or more second sections defined along a length of the second ridge waveguide comprise a third section of constant width extending from the optical output and a fourth section of tapering width, the fourth section of tapering width in optical communication with the third section and the merged waveguide structure.

In various embodiments, the constant width of the first section of constant width and the third section of constant width range from about 1 um to about 5 um or from about 2 um to about 4 um. In various embodiments, the tapering width of the second section and the fourth section ranges from about 1.5 times to about 7 times the constant width of the first section and the third section or from about 3 times to about 7 times the constant width of the first section and the third section. In various embodiments, a length of the second section and the fourth section ranges from about 10 um to about 400 um or from about 50 um to about 200 um.

In various embodiments, the merged waveguide structure has a length equal to about s/(2 tan φ), wherein s is distance between a point along the center line of the first ridge wave guide and a point along the center line of the second ridge wave guide along a connector line perpendicular to the reflector or two points thereof, the connector line disposed in the plane wherein the first ridge waveguide and the second ridge waveguide interface with the merged waveguide section.

In some embodiments, the first ridge waveguide and the second ridge waveguide intersect at a common point in the merged waveguide structure, and wherein merged waveguide structure is rounded at the common point with a radius of curvature from about 0.1 um to about 2 um or preferably between about 0.25 um and about 0.75 um. In some embodiments, the back surface is substantially planar or curved, wherein a surface of the reflector is substantially planar or curved. In various embodiments, the first surface is at least partially defined by a substantially central curved portion disposed between a first substantially planar region and a second substantially planar region, wherein a side of the first ridge waveguide and a side of the second ridge waveguide diverge from or converge to the central curved portion. In many embodiments, the reflective loop structure is substantially symmetric about a plane that substantially divides the structure with each ridge wave guide extending as a branch with cross-sections that change along each branch.

In part, in another aspect, the disclosure relates to an optical device that includes a reflective loopback structure. In various embodiments, the reflective loopback structure may include a reflector; a first ridge waveguide defining an optical input, the first ridge waveguide comprising one or more first sections defined along a length of the first ridge waveguide; a second ridge waveguide defining an optical output, the second ridge waveguide comprising one or more second sections defined along a length of the second ridge waveguide; and a merged waveguide structure defining a front surface and a back surface and a first axis. In various embodiments, each of the first waveguide and the second waveguide define an adiabatic bend that causes a section of each waveguide to be parallel with the other. In many embodiments, the reflector is disposed along at least a portion of the back surface. In some embodiments, the first axis is normal to the front surface and the back surface at the point it intercepts those surfaces. In various embodiments, the first ridge waveguide and the second ridge waveguide are angled relative to each other by an angle θ defined therebetween. In some embodiments, the first ridge waveguide and/or the second ridge waveguide may each extend from the front surface in different directions and each angled relative to the first axis by an angle φ, wherein φ is about θ/2. In various embodiments, the optical input is in optical communication with the optical output and the reflector is in optical communication with the first optical input and the first optical output. In many embodiments, each adiabatic bend includes a first curvature transition tapering section, a constant radius section, and a second curvature transition tapering section, wherein the first curvature transition tapering section tapers a curvature from a straight waveguide to the constant radius section, and wherein the second curvature transition tapering section tapers a curvature from the constant radius section back to a straight but angled section.

In various embodiments, a length of reflective loopback structure from the optical input or the optical output to the reflector ranges from about 200 um to about 1200 um. In some embodiments, the constant radius section has a radius of curvature between about 100 um and about 25 mm or between about 1 mm and about 8 mm. In many embodiments, the angle θ is between about 15 to about 30 degrees. In some embodiments, the first ridge waveguide and the second ridge waveguide each have a width of between about 1 um to about 20 um or between about 3 to about 15 um. In some embodiments, the first ridge waveguide and the second ridge waveguide each have a height of between about 0.5 um to about 3 um or between about 1 um to about 2 um. In various embodiments, the first ridge waveguide, the second ridge waveguide, and the merged waveguide section comprise a plurality of layers including a substrate and a confinement layer. In some embodiments, the two waveguides comprise one or more of: silicon (Si); indium phosphide (InP); or gallium arsenide (GaAs).

In part, in one aspect, the disclosure relates to a method for reversing a direction of light propagation in an optical device. In some embodiments, the method also includes propagating light through an optical input of a first ridge waveguide. In some embodiments, the method also includes transmitting the light through a plurality of sections of a first ridge waveguide, where one of the sections of the first ridge waveguide is angled relative to a second ridge waveguide. In many embodiments, the method also includes transmitting the light into a merged waveguide section from which the first waveguide and the second waveguide symmetrically extend from. In various embodiments, the method also includes reflecting light from a reflector such that it enters a section of the second waveguide angled relative to the first ridge waveguide. In some embodiments, the method also includes transmitting at least a portion of the reflected light from an optical output in optical communication with the second ridge waveguide.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

The present disclosure relates generally to an optical device/structure operable to reverse the direction of light in a photonic integrated circuit or other device using a substantially symmetric arrangement of two waveguides that share a merged or common waveguide region bounded by a reflective surface. A reflective device as disclosed herein generally involves a merging of optical paths in the immediate vicinity of the reflector, and thus a merging of waveguides. Such merging waveguides may introduce unwanted diffraction that may cause optical losses or coupling into undesired optical paths. An adiabatic tapering of the width of waveguides prior to merging may reduce diffraction. Furthermore, care must be taken in such a device to steer the waveguides toward the reflector. In low-confinement waveguides in particular, waveguides' directions must be adjusted very slowly. As such, a relatively small angle between waveguides near the reflector is desirable to reduce the area cost of a slow steering of waveguides toward a reflector. Under these design constraints, Applicant discloses various exemplary reflective loopback structures. In various embodiments, the structures are suitable for low-confinement waveguides.

Figure 1A:
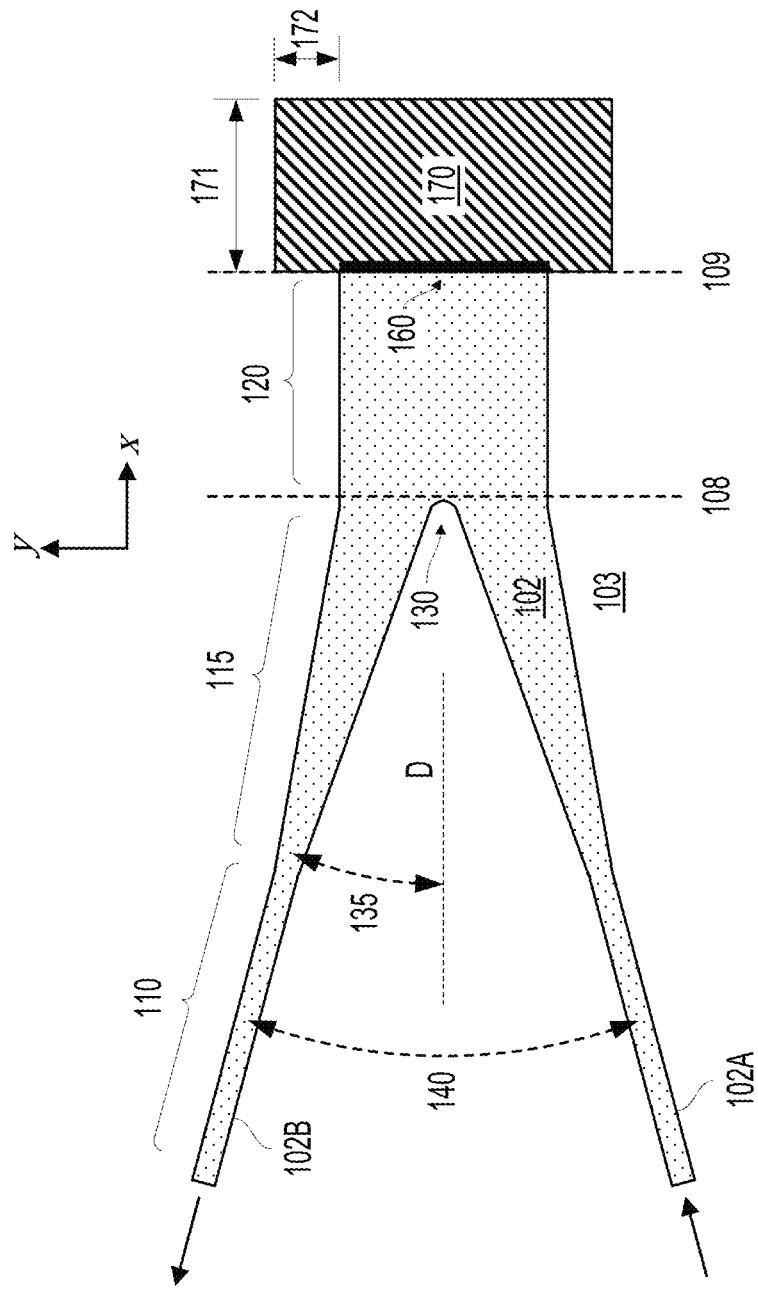
FIG. 1A is a top-down view of a structure implementing a reflective optical loopback according to an exemplary embodiment of the disclosure.

Refer now the exemplary embodiment of FIG. 1A. FIG. 1A is a top-down view of a structure implementing a reflective optical loopback. As shown, waveguides 102A, 102B approach a reflector 160. In various embodiments, the waveguides may be ridge waveguides and formed from one or more layers of materials which may be deposited and/or etched. To avoid optical diffraction—wherein light may spread away from its intended optical path and possibly not couple into the output waveguide from the input waveguide-when the two waveguides merge near the reflector, the waveguides begin at a constant width 110 and undergo a tapering of their widths 115 before merging 120. In many embodiments, in the constant-width region 110, the waveguides have a width from about 1 to about 5 um or preferably a width of between about 2 to about 4 um. In many embodiments, as waveguides are widened, they achieve a width of about 1.5 times to about 7 times that of the width in the constant-width region 110, or preferably a width of about 3 times to about 5 times that of the width in the constant-width region. In many embodiments, the waveguide width tapering occurs over a length of about 10 to about 400 um or preferably about 50 to about 200 μm. In many embodiments, an etched region 170 partially defines the reflector facet 160. In most embodiments, the etch extends to a depth into the substrate below that of the base 130 of the waveguides. In many embodiments, the etch 170 has a width 171 of between about 1 to about 200 μm and an extent 172 beyond the reflector facet of about 0 to about 100 μm. In many embodiments, a region 130 where the interior borders of the waveguides intersect is rounded. In many embodiments, the rounded region 130 has a radius of curvature between about 0.1 to about 2 μm, or preferably between about 0.25 to about 0.75 μm. In most embodiments, waveguides approach the reflector with an angle θ 140 between them, or half-angle φ 135, also called the incidence angle, wherein φ=θ/2.

In many embodiments, the merged section 120 is bounded by two surfaces or layers 108, 109. The layers or surfaces 108, 109 may be referenced as first and second surfaces/layers (or vice versa) or front and back surfaces/layers in various embodiments. In some embodiments, surfaces or layers 108, 109 may be planar, irregular, regular, continuous, discontinuous, and combinations of the foregoing. Surface/layer 108 define one or more angles at which waveguides 102A and 102B are angled relative to the centerline D. In various embodiments, some or the entire rounded boundary shown at the junction of waveguides 102B, 102A in region 130 may be part of the surface/layer 108.

A back surface 109 lies at the boundary of the merged section and the reflector 160, and is perpendicular to a centerline D between the waveguides. The back surface 109 may be curved to follow the shape of a curved reflector in some embodiments, see for example FIG. 1C and accompanying discussion. In most embodiments, a front surface 108 lies near to where the waveguides merge and is at least a portion of which is curved, angled, or perpendicular to the centerline D. The position and shape of the front surface/layer 108 may vary in different embodiments due to rounding in the region 130 and the incidence angle 135, but has a position in the x direction that is in the neighborhood of the rounded region 130 and may include some or all of the curved boundary shown in rounded region 130 wherein the waveguides converge or diverge depending on the reference frame. Surface/layer 108 may include portions of the curved boundary shown or an angle vertex if waveguides 102A, 102B extend from a common vertex in lieu of a curved share surface or layer portion. In most embodiments, the front surface generally separates the region 120 wherein waveguides are merged from other regions wherein the two waveguides 102A, 102B are distinct and separate and may undergo transitions in curvature or width, for example. In various embodiments, the waveguides and merged section are unitary structure and the front surface may be within or bound the merged section of the optical loopback structure. The various layers and surfaces disclosed herein may be continuous and integral with various waveguides, layers, surfaces, sections and other structures disclosed herein.

Figure 1B:
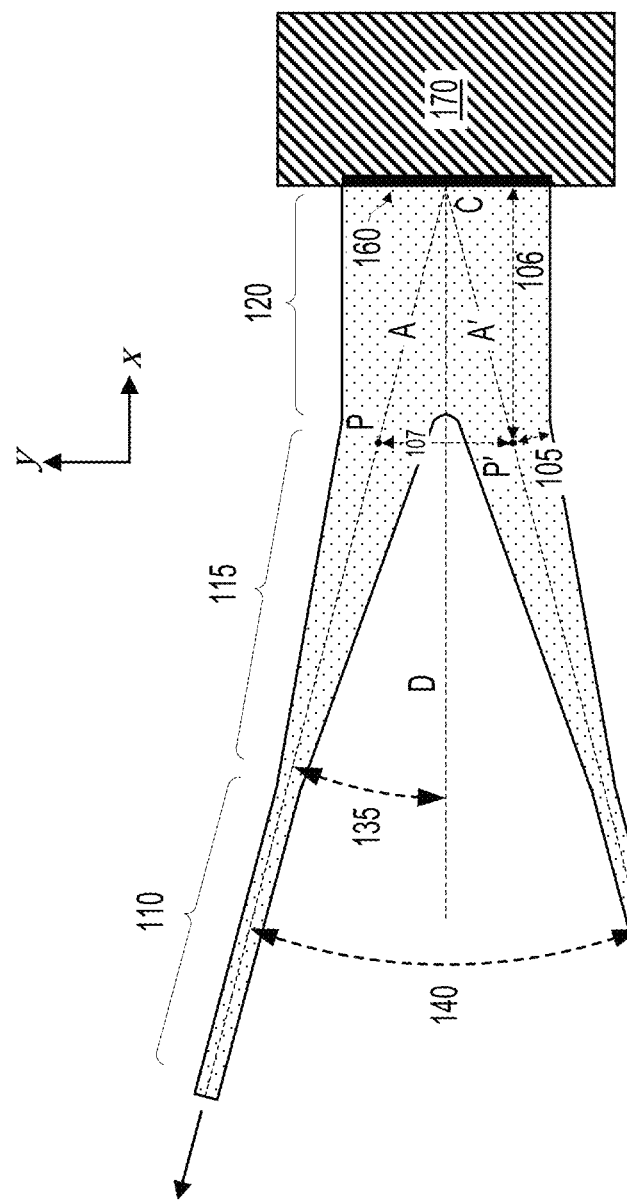
FIG. 1B is a top-down view of a structure implementing a reflective optical loopback in low-confinement waveguides according to an exemplary embodiment of the disclosure.

Refer now to the exemplary embodiment of FIG. 1B. FIG. 1B is a top-down view of a structure implementing a reflective optical loopback as part of an optical device. The top-down view illustrates various geometric relationships of the structure according to an exemplary embodiment of the disclosure. The structure in FIG. 1B may be the same as that of FIG. 1A, but is annotated with different geometrical relationships. In most embodiments, the angle θ 140 between the waveguides is measured from the center of the reflector 160, and in many embodiments, the angle θ 140 is between about 10 to about 40 degrees or preferably between about 15 to about 30 degrees. In many embodiments, the half-angle or incidence angle (135 is half the full angle θ 140.

In the following, consider a distance d 106 entirely in the X-direction between the plane in which the reflector 160 lies and either of two points, one point P lying on the center line A of one of the waveguides and the other point P' lying on the center line of the other waveguide A', wherein the two points share the same position in the y direction. Consider also the spacing s 107, entirely in the y-direction, between the two points P, P'. In most embodiments, the distance d 106 and the spacing s 107 are related as d=s/(2 tan φ). This is if the points P and P' are taken in either section 110 or 115 and the waveguides between the points P and P' and the merged section 120 are not curved. Finally, consider also the center point C of the reflective facet at the vertex of the waveguide center lines A, A'; in most embodiments, the reflector facet 160 at the point C is normal to the middle line D between the waveguides that bisects the full angle θ 140 between the waveguides. In some embodiments, the reflector may be curved, but the normal to the reflector at the point C still lies on the middle line D.

Figure 1C:
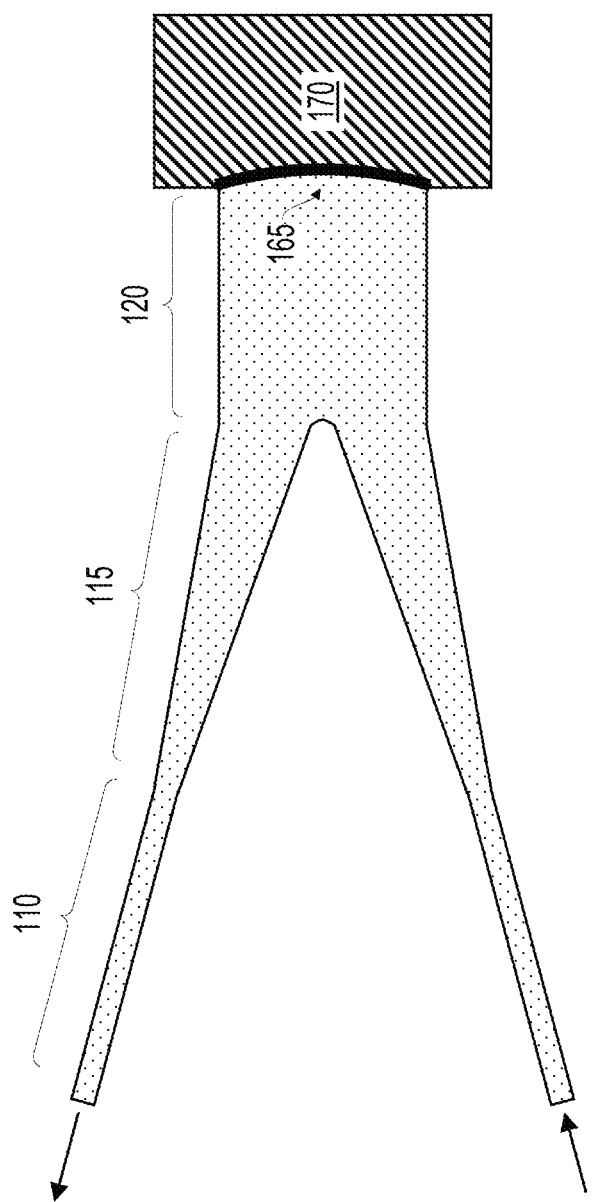
FIG. 1C is a top-down view of an alternate structure implementing a reflective optical loopback in waveguides, wherein the loopback is achieved through a curved reflector according to an exemplary embodiment of the disclosure.

Refer now to the exemplary embodiment of FIG. 1C. FIG. 1C is a top-down view of a structure implementing a reflective optical loopback with low-confinement waveguides and wherein the reflector 165 is curved. In many embodiments, the optical wavefront of wave advancing from a waveguide toward the reflector may be curved because of optical wave diffraction in the merged section 120. Substantial waveguide widening in the width taper region substantially reduces diffraction in the merged section so curving the facet may not be required in some embodiments. Curving the facet may be needed in embodiments with low incidence angle (as longer propagation in merged section) and in embodiments with modest width tapering as stronger diffraction will result. In many embodiments, the reflective facet may be curved in the plane defined by the angled waveguides to improve the optical coupling back into the second waveguide by straightening the curvature of the optical wavefront. In most embodiments, both the curvature of the facet and the corrected curvature of the optical wavefront are in the plane defined by the angled waveguides. In many embodiments, a curved reflector has a curvature of between about 0 to about 20 mm-1 or preferably between about 1 to about 5 mm$^{-1}$. In most embodiments, the reflective facet remains straight in the direction normal to the plane defined by the angled waveguides.

Figure 2:
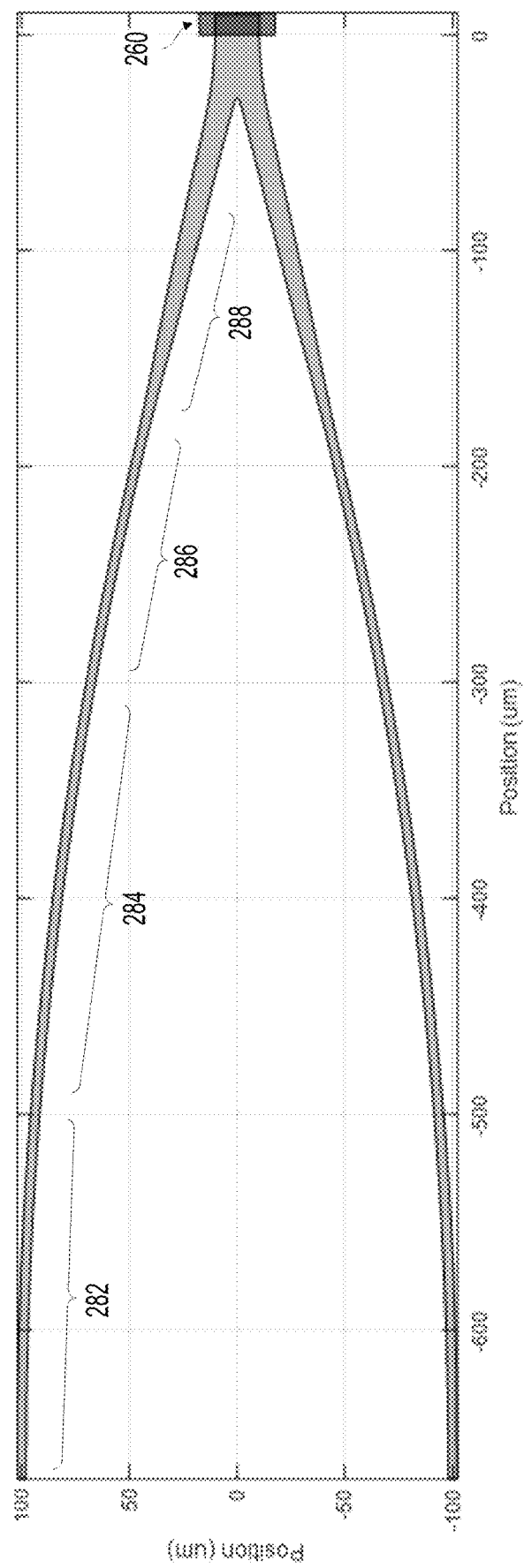
FIG. 2 is a top-down view of a structure implementing a reflective optical loopback according to an exemplary embodiment of the disclosure.

Refer now to the exemplary embodiment of FIG. 2. FIG. 2 is a top-down view of a region wherein waveguides approach a reflective optical loopback structure. In many embodiments, low-confinement waveguides must undergo adiabatic transitions in curvature to slowly approach the reflector 260. In most embodiments, waveguides begin at zero curvature and transition adiabatically in curvature in a region 282 wherein waveguides begin to approach one another and the reflector. In most embodiments, waveguides then remain in a region 284 of constant radius of curvature before undergoing another adiabatic curvature transition back to zero curvature in a region 286. In many embodiments, in the constant-curvature region 284, waveguides have a constant radius of curvature between about 100 µm and about 25 mm or preferably between about 1 and about 8 mm. In many embodiments, the length of either adiabatic curvature transition region 282, 286 is between about 5 µm to about 500 µm or preferably between about 10 to about 200 µm. Finally, waveguides are widened in some region 288.

Figure 3A:
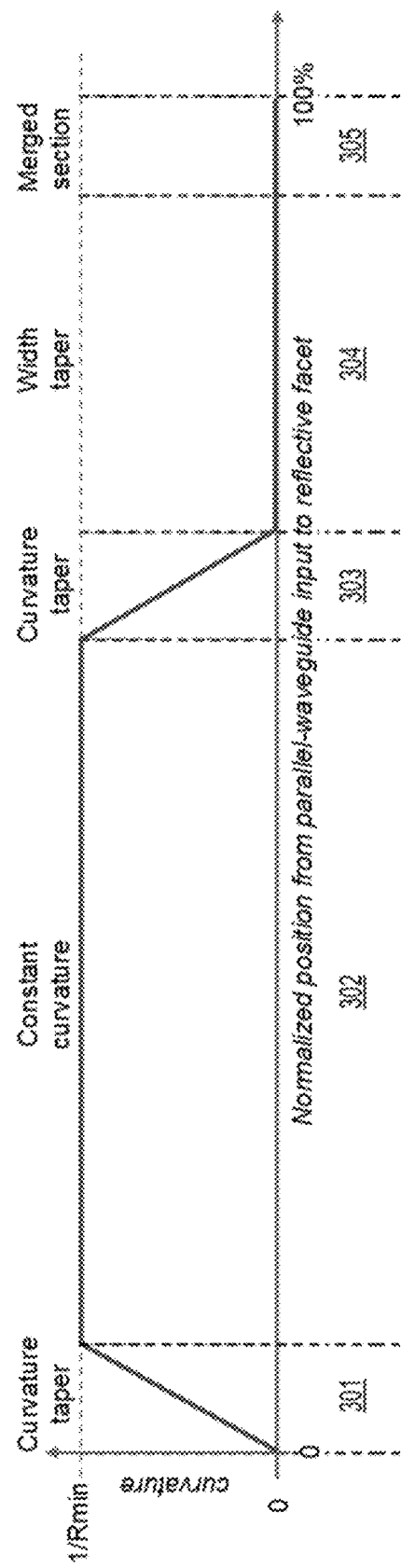
FIG. 3A is a plot of waveguide curvature versus a normalized distance along the waveguide according to an exemplary embodiment of the disclosure.
Figure 3B:
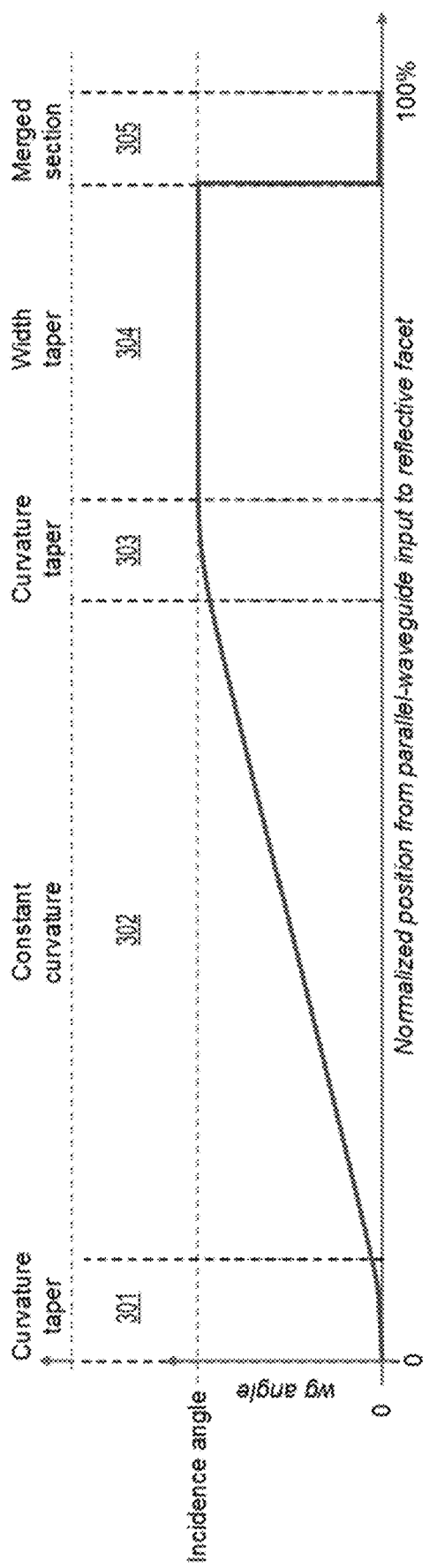
FIG. 3B is a plot of waveguide angle versus a normalized distance along the waveguide according to an exemplary embodiment of the disclosure.
Figure 3C:
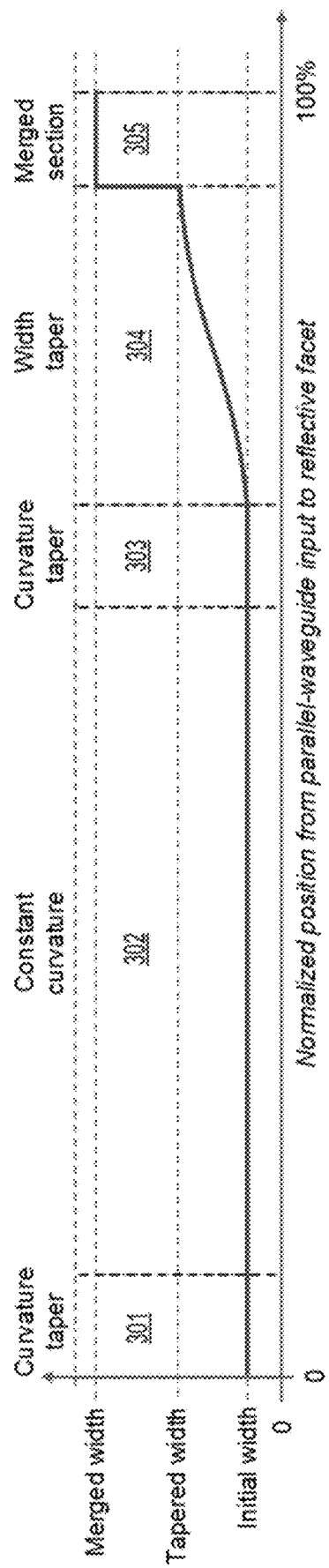
FIG. 3C is a plot of waveguide width versus a normalized distance along the waveguide according to an exemplary embodiment of the disclosure.

Refer now to the embodiments of FIGS. 3A, 3B, and 3C. Note that the lengths of the sections 301-305 are consistent amongst FIGS. 3A, 3B, and 3C in various embodiments.

Refer now to the exemplary embodiment of FIG. 3A. FIG. 3A is a plot of the curvature of waveguides along a normalized position from parallel-waveguide input to a reflective facet in a reflective loopback structure disclosed herein. A curvature taper region 301 sees a waveguide transition linearly in curvature space from zero curvature to a maximal curvature of $1/R_{min}$. The length of this transition is between about 5 µm and about 500 µm and preferably between about 10 µm and about 200 µm. In many embodiments, each waveguide maintains a constant curvature of $1/R_{min}$ in a region 302. The length of this constant curvature section depends on the radius of curvature $R_{min}$ and the desired incidence angle and is typically between about 40 µm and about 4 mm and preferably between about 400 µm and about 1400 µm. The constant curvature ($1/R_{min}$) is between about 0.25 mm$^{-1}$ and about 10 mm$^{-1}$ and preferably between about 0.125 mm$^{-1}$ and about 1 mm$^{-1}$. In many embodiments, a waveguide then transitions linearly in curvature space back to zero curvature in another transition region 303. The length of this transition is between about 5 µm and about 500 µm and preferably between about 10 µm and about 200 µm. In many embodiments the two curvature transition regions 301, 303 are the same in length and range of values of curvature but the transition in one region is reversed in direction with respect to the other. In many embodiments, each waveguide remains at zero curvature, i.e. takes a substantially straight approach to the reflector for the remainder of the distance to the reflector.

Refer now to the exemplary embodiment of FIG. 3B. FIG. 3B is a plot of an angle between a waveguide and a middle line between waveguides as the angle varies along a normalized position from parallel-waveguide input to a reflective facet in a reflective loopback structure disclosed herein. As waveguides begin their transitions in curvature from straight, parallel waveguides, an angle between each waveguide and the middle line between the waveguides varies. The angle transitions from zero to the maximal incidence angle Y in the curvature transition regions 301, 303 and the constant-curvature region 302. In many embodiments, as waveguides' widths are tapered in a region 304 the waveguides maintain a straight, constant-angle approach to the reflector before merging in a final region 305 before the reflector.

Refer now to the exemplary embodiment of FIG. 3C. FIG. 3C is a plot of the width of waveguides along a normalized position from parallel-waveguide input to a reflective facet in a reflective loopback structure disclosed herein. In many embodiments, as waveguides transition in curvature in regions 301, 302, 303 to approach each other and the reflector, the waveguides' widths are constant. In many embodiments, the waveguides' widths are tapered adiabatically in a region 304 to widen the waveguides and reduce diffraction in and around the reflector. The adiabatic tapering occurs over a length of about 10 µm to about 400 µm or preferably from about 50 to about 200 µm. Finally, in many embodiments, in a region 305 where the waveguides merge, the width of the merged waveguides is substantially larger than the width of either waveguide just before their merging. The exact width of the merged region depends on the inner radius of curvature at the merge and the incidence angle but is between about 1.75 times and about 2.25 times the width of an individual waveguide prior to the inner merging such as for example via round region 130 of FIG. 1A, for example. For an angled or curved waveguide, the width is taken normal to the local center line of the waveguide. In most embodiments, the length of the merged section 305 depends on the incidence angle and waveguide spacing @ 106. Typically, the length of the merged section 305 is between about 10 and about 350 µm and preferably between about 20 and 100 µm.

Figure 4:
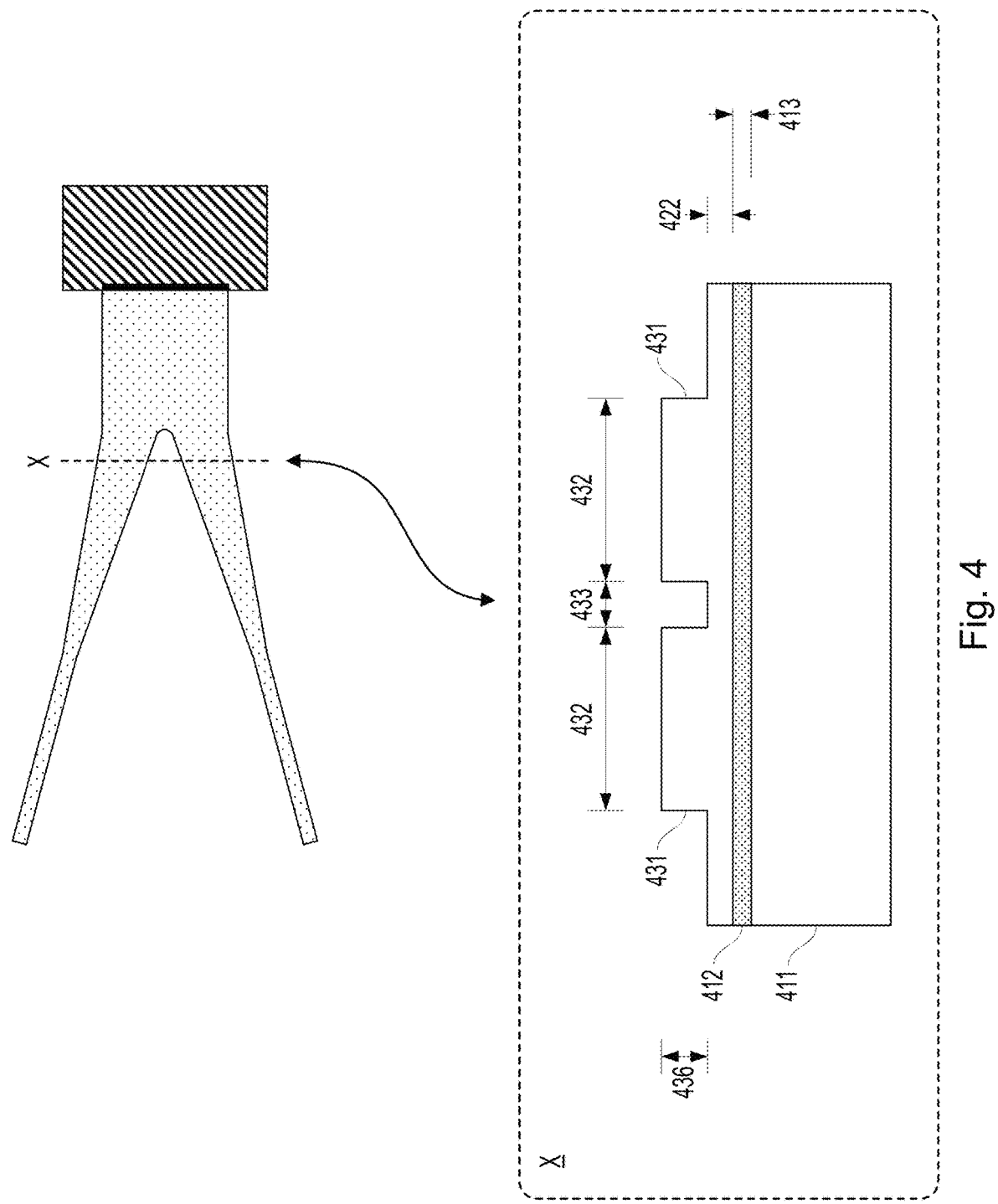
FIG. 4 is a cross-sectional view of waveguides in a region before a waveguide merging according to an exemplary embodiment of the disclosure.

Refer now to the exemplary embodiment of FIG. 4. FIG. 4 is a cross-sectional view of an optical loopback structure in a plane X through the waveguides 431 somewhere before their merging. In many embodiments, waveguides may be sized to have a width 432 that ranges from about 1 to about 20 µm or between about 3 to about 15 µm. In many embodiments, a separation 433 between the ridge waveguides depends on the position of the plane X. In many embodiments, waveguides are also characterized by a ridge etch depth 436 of between about 0.5 to about 3 µm or between about 1 to about 2 µm. In many embodiments, a confinement layer 412 lies below the ridge waveguides 431 and above the rest of the substrate 411.

In many embodiments, the confinement layer has a thickness 413 of between about 10 to about 300 nm and a depth 422 beneath the waveguides of between about 50 to about 1000 nm. In many embodiments, the material of the ridge waveguides 431 and the substrate 411 may be Si, InP, or GaAs, or some material substantially composed of Si, InP, or GaAs. In many embodiments, the confinement layer 412 may be composed of SiO$_2$, AlGaInAs, or InGaAsP, or some material substantially composed of SiO$_2$, AlGaInAs, or InGaAsP. In some embodiments, multiple additional layers may be present, including additional semiconductor layers, dielectric passivation layers, and metallization layers.

In one embodiment, the ridge waveguide 431 and the substrate may mostly composed of Si while the confinement layer 412 may be mostly composed of SiO$_2$. In another embodiment, the ridge waveguide and the substrate may be mostly composed of InP while the confinement layer 412 may include at least one quantum well made of InGaAsP or AlGaInAs. In another embodiment, the ridge waveguide and the substrate may be mostly composed of GaAs while the confinement layer 412 may include at least one quantum well made of AlGaAs or AlGaInAs.

Figure 5:
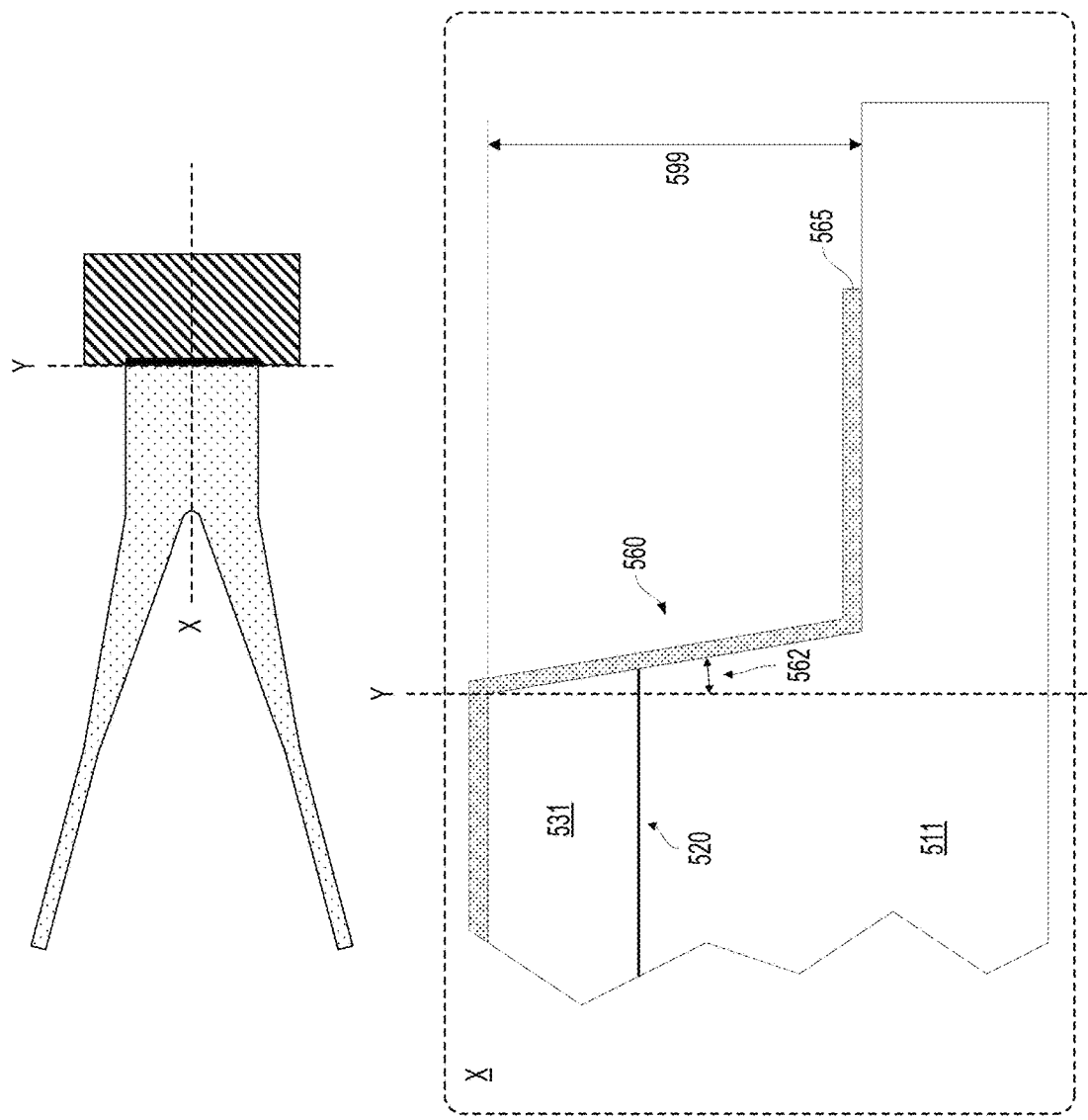
FIG. 5 is a cross-sectional view of a reflector formed in a semiconductor material and configured to loop back light received by an input port to an output port of an optical device according to an exemplary embodiment of the disclosure.

Refer now to the exemplary embodiment of FIG. 5. FIG. 5 is a cross-sectional view of an optical loopback structure through a plane X normal to the reflector and plane Y along the surface thereof. In many embodiments, the reflector comprises a facet or surface 560 defined by an etch through the ridge waveguide 531, through the confinement layer 520, and into the substrate 511. In many embodiments, the etch has a depth 599 of between about 2 to about 10 μm, or between about 3 to about 6 μm, or about 4 μm. In many embodiments, the reflector has an angle 562 within about 5 degrees from the vertical, or within about 2 degrees from the vertical, or within about 1 degree from the vertical. In many embodiments, the reflector facet is covered in a reflective coating 565 composed substantially of a layer of gold (Au) with a thickness between about 10 to about 2000 nm or between about 100 and about 500 nm. In many embodiments, the reflective coating may comprise a plurality of dielectric layers, each layer having a thickness of between about 50 to about 75 nm or between about 100 to about 500 nm. In various embodiments, the reflector and surface 560 thereof is curved. The dielectric layers may include silicon nitride or silicon dioxide.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112 (f). Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. An optical device comprising:
   a reflective loopback structure comprising:
      a reflector;
      a first ridge waveguide defining an optical input, the first ridge waveguide comprising one or more first sections defined along a length of the first ridge waveguide;
      a second ridge waveguide defining an optical output, the second ridge waveguide comprising one or more second sections defined along a length of the second ridge waveguide; and
      a merged waveguide structure defining a front surface and a back surface and a first axis;
      the reflector disposed along at least a portion of the back surface, the first axis normal to the front surface and the back surface,
      the first ridge waveguide and the second ridge waveguide angled relative to each other by an angle θ defined therebetween,
      the first ridge waveguide and the second ridge waveguide each extending from the front surface in different directions and each angled relative to the first axis by an angle φ, wherein φ is about θ/2,
      the optical input in optical communication with the optical output,
      the reflector in optical communication with the optical input and the optical output, wherein the one or more first sections defined along a length of the first ridge waveguide comprises a first section of constant width extending from the optical input and a second section of tapering width, the second section of tapering width in optical communication with the first section and the merged waveguide structure, wherein the one or more second sections defined along a length of the second ridge waveguide comprise a third section of constant width extending from the optical output and a fourth section of tapering width, the fourth section of tapering width in optical communication with the third section and the merged waveguide structure.

2. The optical device of claim 1 wherein the angle $\theta$ is between about 10 to about 40 degrees.

3. The optical device of claim 2 wherein the angle $\theta$ is between about 15 to about 30 degrees.

4. The optical device of claim 1, wherein the constant width of the first section of constant width and the third section of constant width range from about 1 um to about 5 um.

5. The optical device of claim 1, wherein the tapering width of the second section and the fourth section ranges from about 1.5 times to about 7 times the constant width of the first section and the third section.

6. The optical device of claim 1, wherein a length of the second section and the fourth section ranges from about 10 um to about 400 um.

7. The optical device of claim 1 wherein the merged waveguide structure has a length equal to about $s/(2 \tan \varphi)$, wherein s is a distance between a point along the center line of the first ridge waveguide and a point along the center line of the second ridge waveguide along a connector line perpendicular to the reflector or two points thereof, the connector line disposed in the plane wherein the first ridge waveguide and the second ridge waveguide interface with the merged waveguide structure.

8. The optical device of claim 1 wherein the first ridge waveguide and the second ridge waveguide intersect at a common point in the merged waveguide structure, and wherein the merged the waveguide structure is rounded at the common point with a radius of curvature from about 0.1 um to about 2 um.

9. The optical device of claim 1 wherein the back surface is substantially planar or curved, wherein a surface of the reflector is substantially planar or curved, wherein the front surface is at least partially defined by a substantially central curved portion disposed between a first substantially planar region and a second substantially planar region, wherein a side of the first ridge waveguide and a side of the second ridge waveguide diverge from the central curved portion.

10. An optical device comprising:
a reflective loopback structure comprising:
a reflector;
a first ridge waveguide defining an optical input, the first ridge waveguide comprising one or more first sections defined along a length of the first ridge waveguide;
a second ridge waveguide defining an optical output, the second ridge waveguide comprising one or more second sections defined along a length of the second ridge waveguide; and
a merged waveguide structure defining a front surface and a back surface and a first axis;
each of the first ridge waveguide and the second ridge waveguide define an adiabatic bend that causes a section of each waveguide to be parallel with the other,
the reflector disposed along at least a portion of the back surface, the first axis normal to the front surface and the back surface at a point it intercepts those surfaces,
the first ridge waveguide and the second ridge waveguide angled relative to each other by an angle $\theta$ defined therebetween,
the first ridge waveguide and the second ridge waveguide each extending from the front surface in different directions and each angled relative to the first axis by an angle $\varphi$, wherein $\varphi$ is about $\theta/2$,
the optical input in optical communication with the optical output,
the reflector in optical communication with the optical input and the optical output,
wherein each adiabatic bend comprises a first curvature transition tapering section, a constant radius section, and a second curvature transition tapering section, wherein the first curvature transition tapering section tapers a curvature from a straight waveguide to the constant radius section, and wherein the second curvature transition tapering section tapers a curvature from the constant radius section back to a straight but angled section, wherein the first ridge waveguide, the second ridge waveguide, and the merged waveguide structure comprise a plurality of layers including a substrate and a confinement layer.

11. The optical device of claim 10 wherein a length of reflective loopback structure from the optical input or the optical output to the reflector ranges from about 200 um to about 1200 um.

12. The optical device of claim 10 wherein the constant radius section has a radius of curvature between about 100 um and about 25 mm or between about 1 mm and about 8 mm.

13. The optical device of claim 10 wherein the angle $\theta$ is between about 15 to about 30 degrees.

14. The optical device of claim 10 wherein the first ridge waveguide and the second ridge waveguide each have a width of between about 1 um to about 20 um.

15. The optical device of claim 10 wherein the first ridge waveguide and the second ridge waveguide each have a height of between about 0.5 um to about 3 um.

16. An optical device comprising:
a reflective loopback structure comprising:
a reflector;
a first ridge waveguide defining an optical input, the first ridge waveguide comprising one or more first sections defined along a length of the first ridge waveguide;
a second ridge waveguide defining an optical output, the second ridge waveguide comprising one or more second sections defined along a length of the second ridge waveguide; and
a merged waveguide structure defining a front surface and a back surface and a first axis;
each of the first ridge waveguide and the second ridge waveguide define an adiabatic bend that causes a section of each waveguide to be parallel with the other,
the reflector disposed along at least a portion of the back surface, the first axis normal to the front surface and the back surface at a point it intercepts those surfaces, the first ridge waveguide and the second ridge waveguide angled relative to each other by an angle $\theta$ defined therebetween, the first ridge waveguide and the second ridge waveguide each extending from the front surface in different directions and each angled relative to the first axis by an angle $\varphi$, wherein $\varphi$ is about $\theta/2$, the optical input in optical communication with the optical output, the reflector in optical communication with the optical input and the optical output, wherein each adiabatic bend comprises a first curvature transition tapering section, a constant radius section, and a second curvature transition tapering section, wherein the first curvature transition tapering section tapers a curvature from a straight waveguide to the constant radius section, and wherein the second curvature transition tapering section tapers a curvature from the constant radius section back to a straight but angled section, wherein the first and second ridge waveguides comprise one or more of:

silicon (Si);

indium phosphide (InP); or gallium arsenide (GaAs).

* * * * *